(12) United States Patent
Albaugh et al.

(10) Patent No.: US 8,615,455 B2
(45) Date of Patent: Dec. 24, 2013

(54) SYSTEM FOR METERING IN AN ON-DEMAND UTILITY ENVIRONMENT

(75) Inventors: Virgil A. Albaugh, Austin, TX (US);
Grisselle M. Keller, Tampa, FL (US);
Hari H. Madduri, Austin, TX (US);
Mark C. Waldroff, Panama City, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/401,184

(22) Filed: Feb. 21, 2012

(65) Prior Publication Data

US 2012/0209992 A1 Aug. 16, 2012

Related U.S. Application Data

(62) Division of application No. 10/721,432, filed on Nov. 25, 2003, now Pat. No. 8,135,636.

(51) Int. Cl.
*G06Q 40/00* (2012.01)
*G06Q 30/04* (2012.01)
*H04L 12/14* (2006.01)
*H04M 15/00* (2006.01)

(52) U.S. Cl.
CPC ............. *G06Q 40/00* (2013.01); *G06Q 30/04* (2013.01); *H04L 12/14* (2013.01); *H04M 15/41* (2013.01); *H04M 15/44* (2013.01); *H04M 15/52* (2013.01)
USPC .............................. 705/35; 707/609; 709/209

(58) Field of Classification Search
CPC ........ G06Q 30/04; G06Q 40/00; H04L 12/14; H04L 12/1403; H04L 12/1432; H04M 15/41; H04M 15/44; H04M 15/52
USPC ........... 705/7.26, 35; 707/609, 899, 960, 790; 709/209

See application file for complete search history.

(56) References Cited

U.S. PATENT DOCUMENTS 5,544,353 A 8/1996 Forman et al.
5,717,923 A 2/1998 Dedrick (Continued)

FOREIGN PATENT DOCUMENTS

| EP | 1101172 B1 | * | 6/2003 | |
|----|----|----|----|----|
| GB | 2364420 B | * | 11/2002 | ............... G07F 15/00 |
| WO | WO 03003245 A1 | * | 1/2003 | ............... G06F 17/30 |

OTHER PUBLICATIONS

Business Wire; "World Wireless Communications to Focus on Web-Enabled Automated Meter Reading Sector -AMR-"; Oct. 2, 2001; pp. 7-9.*

(Continued)

*Primary Examiner* — Ella Colbert
(74) *Attorney, Agent, or Firm* — Yee & Associates, P.C.; Mark Vallone

(57) ABSTRACT

A method for metering on-demand service (ODS) resource consumption by a user comprising a web services interface, a processing engine, and configuration data. A data gathering agent in the ODS stores the usage data in records, combines the records into packets, and transmits the packets to the web services interface. The web services interface passes the packets onto the processing engine, which stores the records in the packet into a database. The generalized format of the record is critical because it allows the metrics to be stored in the record table with the usage data. When a record contains an instruction to close a UOW, the processing engine applies the configuration data comprising composition rules and record selection rules to the database. The record selection rules select the desired records from the database. The composition rules aggregate, normalize, and compose the selected records to produce a metric.

27 Claims, 7 Drawing Sheets

(56) References Cited

U.S. PATENT DOCUMENTS

| | | | |
|---|---|---|---|
| 5,870,743 A * | 2/1999 | Cohen et al. | 1/1 |
| 5,930,799 A * | 7/1999 | Tamano et al. | 1/1 |
| 5,933,603 A | 8/1999 | Vahalia et al. | |
| 5,956,697 A | 9/1999 | Usui | |
| 6,052,671 A * | 4/2000 | Crooks et al. | 705/34 |
| 6,108,688 A | 8/2000 | Nielsen | |
| 6,199,068 B1 | 3/2001 | Carpenter | |
| 6,205,437 B1 | 3/2001 | Gifford | |
| 6,208,977 B1 | 3/2001 | Hernandez et al. | |
| 6,336,138 B1 | 1/2002 | Caswell et al. | |
| 6,338,046 B1 | 1/2002 | Saari et al. | |
| 6,438,537 B1 | 8/2002 | Netz et al. | |
| 6,580,691 B1 | 6/2003 | Bjoerkman et al. | |
| 6,594,692 B1 | 7/2003 | Reisman | |
| 6,618,709 B1 | 9/2003 | Sneeringer | |
| 6,728,703 B1 | 4/2004 | Wan et al. | |
| 6,910,042 B2 | 6/2005 | Albaugh et al. | |
| 6,961,716 B2 | 11/2005 | Rhodes | |
| 6,980,973 B1 | 12/2005 | Karpenko | |
| 7,013,323 B1 | 3/2006 | Thomas et al. | |
| 7,089,561 B2 | 8/2006 | Morrison et al. | |
| 7,113,932 B2 | 9/2006 | Tayebnejad et al. | |
| 7,113,951 B2 * | 9/2006 | Ashida et al. | 707/803 |
| 7,370,013 B1 * | 5/2008 | Aziz et al. | 705/40 |
| 7,849,130 B2 | 12/2010 | Albaugh et al. | |
| 8,135,636 B2 | 3/2012 | Albaugh et al. | |
| 2002/0161536 A1 | 10/2002 | Suh et al. | |
| 2003/0018547 A1 | 1/2003 | Steele | |
| 2003/0110416 A1 | 6/2003 | Morrison et al. | |
| 2003/0115316 A1 | 6/2003 | Yang-Huffman | |
| 2003/0123442 A1 | 7/2003 | Drucker et al. | |
| 2003/0137976 A1 | 7/2003 | Zhu et al. | |
| 2005/0071462 A1 | 3/2005 | Bodin et al. | |
| 2005/0114158 A1 | 5/2005 | Albaugh et al. | |

OTHER PUBLICATIONS

Glynn B. Giacone; "Seek and Fine-Tune: Getting the Most from Client Server Transactions; Controlling a smooth-running client-server application requires creative manipulation of an RDMBS's instrumation "metrics." An expert shows how to fine-tune workload performance"; Oct. 1, 1996; pp. 1-10.*

Albaugh, et al., "The utility metering service of the Universal Management Infrastructure," IBM Systems Journal, vol. 43, No. 1, 2004, pp. 179-189.

"Database Processing Fundamentals, Design, and Implementation," Fifth Edition, Kroenke (Ed), Prentice-Hall, Inc., Englewood Cliffs, NJ, pp. 26, 28-30-32-35, 40-42, 48, 55-74, 125-126, 128-132, 138-144, 147, 149-150, and 152, 1995.

"Database Processing Fundamentals, Design, and Implementation," Fifth Edition, Kroenke (Ed), Prentice-Hall, Inc., Englewood Cliffs, NJ, pp. 569-570, 581 and 586, 1995.

"Epson Unveils New Line of High-End Printers Designed Specifically for Graphics Arts Professionals," Business Wire, May 23, 2000, 4 pages.

"XACCT Technologies Enables Usage-Based Billing for Internet: NSPs Can Now 'Right-Price' IP-Based Applications," Business Wire, Sep. 21, 1998, 6 pages.

Antelman, "Getting out of the HTML Business. The Database-Driven Web Site Solution," Information Technology & Libraries, 18(4):176-181, Dec. 1999. (Abstract only).

Breeding, "Demise of the Wings ILL System," Information Today, http://www.librarytechnology.org/ltg-displaytext.pl?RC=9465, Dec. 2001, 6 pages.

Giacone et al., "Seek and Fine-Tune: Getting the Most from Client-Server Transactions; Controlling a Smooth-Running Client Server Application Requires Creative Manipulation of an RDMBS's Instrumentation "Metrics". An Expert Shows how to Fine-Tune Workload Performance," Data Based Solutions, Inc., Oct. 1996, 10 pages.

Muraskin, "Call Monitoring & Recording," Computer Telephony, Jul. 1999, pp. 1-6. (in Notice of Allowance for U.S. Appl. No. 10/721,432).

Office Action, dated Mar. 18, 2008, regarding U.S. Appl. No. 10/721,432, 16 pages.

Response to Office Action, dated Jun. 18, 2008, regarding U.S. Appl. No. 10/721,432, 17 pages.

Final Office Action, dated Oct. 17, 2008, regarding U.S. Appl. No. 10/721,432, 12 pages.

Amendment Pursuant to Request for Continued Examination, dated Jan. 16, 2009, regarding U.S. Appl. No. 10/721,432, 13 pages.

Office Action, dated Apr. 15, 2009, regarding U.S. Appl. No. 10/721,432, 12 pages.

Response to Office Action, dated Jul. 8, 2009, regarding U.S. Appl. No. 10/721,432, 18 pages.

Final Office Action, dated Nov. 25, 2009, regarding U.S. Appl. No. 10/721,432, 14 pages.

Response to Final Office Action, dated Feb. 25, 2010, regarding U.S. Appl. No. 10/721,432, 12 pages.

Advisory Action, dated Mar. 15, 2010, regarding U.S. Appl. No. 10/721,432, 3 pages.

Amendment Pursuant to Request for Continued Examination, dated Mar. 25, 2010, regarding U.S. Appl. No. 10/721,432, 11 pages.

Notice of Allowance, dated Nov. 7, 2011, regarding U.S. Appl. No. 10/721,432, 10 pages.

* cited by examiner

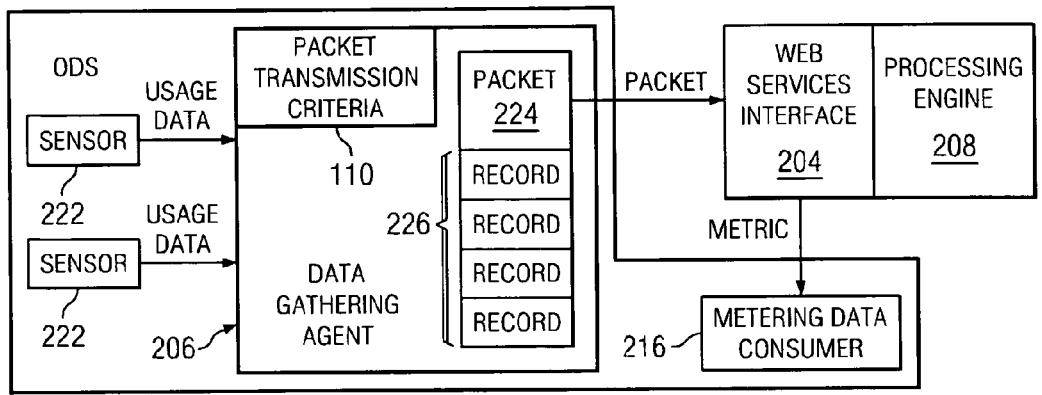

FIG. 4

| | FIELD | | DESCRIPTION | REFERENCE SYMBOL |
|---|---|---|---|---|
| REQUIRED FIELDS | RESOURCE ID | 232 | IDENTIFIES WHAT IS BEING MEASURED | RId |
| | USER ID | 234 | IDENTIFIES ACCOUNT OR USER OR THE RESOURCE | UId |
| | MEASUREMENT VALUE | 236 | THE MEASUREMENT ON THE RESOURCE | MV |
| | UNIT OF WORK | 238 | IDENTIFIES A GROUP OR SET THE RECORD BELONGS TO | UOW |
| | CLOSE UNIT OF WORK | 240 | FLAG USE TO INDICATE CLOSURE OF SET | UOWF |
| | OTHER | 242 | SOME OTHER FIELDS ARE REQUIRED IN THE IMPLEMENTATION SUCH AS TIME STAMPS AND SOME AUDITING FIELDS | |
| ATTRIBUTES | Name1 | 244 | ANY NUMBER OF NAME, VALUE PAIRS TO ASSOCIATE ADDITIONAL DATA WITH THE RECORD | N |
| | Value1 | 246 | | V |
| | ⋮ | | ⋮ | ⋮ |
| | NameN | 244 | | N |
| | ValueN | 246 | | V |

FIG. 5

| Mld | Rld | Uld | MV | UOW | RULE ID |
|---|---|---|---|---|---|
| 534 | 101 | JOE | 10 | 22 | NULL |
| 535 | 100 | AL | 5 | 23 | NULL |
| 536 | 101 | JOE | 15 | 22 | NULL |
| 537 | 101 | JOE | 10 | 31 | NULL |
| 538 | 101 | AL | 10 | 22 | NULL |
| 539 | 100 | JOE | 5 | 31 | NULL |

| Mld | NAME | VALUE |
|---|---|---|
| 534 | SENDER | Joe@white.com |
| 534 | RECEIVER | Barry@black.com |
| 534 | RECEIVER | Charlie@green.com |
| - | - | - |
| 539 | SENDER | Joe@white.com |
| 539 | RECEIVER | Charlie@green.com |

| UOW | STATE |
|---|---|
| 22 | OPEN |
| 23 | CLOSED |
| - | - |
| 31 | OPEN |
| 32 | CLOSE PENDING |

| VRId | VALUE | REFERENCE TAG? | UId |
|---|---|---|---|
| 906 | A+(2*B) | NO | JOE |
| 907 | A+B | YES | A |

| VRId | REFERENCE TAG? | NAME | VALUE |
|---|---|---|---|
| 906 | YES | SENDER | A |
| 907 | NO | SENDER | JOE |

| VRId | TAG NAME | RId | UId |
|---|---|---|---|
| 906 | A | 100 | JOE |
| 906 | B | 101 | UNIQUE |
| 907 | A | 100 | AL |
| 907 | B | 101 | ANY |

| VRId | TAG NAME | NAME | VALUE |
|---|---|---|---|
| 906 | A | SENDER | ANY |
| 907 | A | RECEIVER | Charlie@green.com |

SYSTEM FOR METERING IN AN ON-DEMAND UTILITY ENVIRONMENT

This application is a divisional of application Ser. No. 10/721,432, filed Nov. 25, 2003 now U.S. Pat. No. 8,135,636, status allowed.

FIELD OF THE INVENTION

The present invention relates generally to method for collecting and analyzing data and specifically to a computer program for metering data in an on-demand service environment.

BACKGROUND OF THE INVENTION

With the migration of the service industry to on-demand solutions, access to information technology (IT) applications and computing resources is increasingly being offered through centralized utilities. One of the benefits of centralized utilities is that consumers have access to an increased variety and amount of resources. Similarly, centralized utilities allow the providers to benefit from the economy of scale in offering similar utility resources to a plurality of consumers. These benefits are not limited to utilities and apply to any type of centralized service used by the consumers on as needed basis. Because the centralized services are available to the consumers at any time, the centralized services are known as on demand services (ODSs).

ODSs exist for both business-to-business and business-to-consumer transactions. For example, a client business may outsource their email account services to an ODS provider. Outsourcing the email account services allows the client to have email accounts for their employees without having to hire the technical support staff or purchase and maintain the servers and other hardware required to provide email to their employees. Instead, the ODS provider would hire the technical support staff and purchase and maintain the servers and other hardware required to provide email to the client's employees. The ODS provider would charge the client a fee for providing the email account services. The fee would be based on the number of email transactions, memory usage, and CPU usage by the client's employees. Both parties benefit from this arrangement because the client can focus their resources on its core business activities without having to worry about email account services and the ODS provider can concentrate on providing email account services to its clients.

In a business-to-consumer setting, an ODS may provide a website to help a user prepare his annual income tax return. In that setting, the ODS would charge the user a fee based upon the number of forms the user accessed and/or filed, the number of times the user accessed the help features on the webpage, the total time the user was on the website, and whether the website filed the return for the user. As with the business-to-business ODS, the business-to-consumer ODS benefits both the ODS provider and the end user. The end user benefits by getting access to automated services which would otherwise not be available to him. The ODS provider benefits by concentrating on providing sound tax advice and tax return preparation.

One of the most important aspects of providing any ODS is metering. Metering is the process of measuring the ODS user's consumption of the individual resources offered by the ODS provider. For example, in the email account example above, the ODS provider must meter the client's usage of memory, CPU processing power, and transmission of email messages. In the income tax return website example above, the ODS must meter the client's use of tax forms accessed, tax forms filed, help pages accessed, total logged on time, and whether the website filed the return for the user. Metering can also be used to optimize the ODS provider's internal allocation of resources. For example, the ODS provider can meter its clients' consumption of resources and reconfigure resources as they are needed by the clients. The ODS provider can also bring additional resources online only when the resources are needed by the clients with concomitant financial savings.

Although the two look similar, metering differs from monitoring as outlined in Table 1.

TABLE 1

| Monitoring | Metering |
| --- | --- |
| Monitoring makes observations. | Metering also makes observations, but the data collected and the frequency of collection can be different. |
| Monitoring is essentially checking for something (i.e. comparing a measurement against some predefined value or condition). | Metering is essentially counting something. |
| Monitoring includes rules to interpret and judge the observed event. | Metering does not interpret or judge the observed event. Metering produces an output that is consumed by other modules. |
| Monitoring summarizes data and discards original observations quickly. | Metering may have to retain original observations for auditing or billing purposes. This has implications to both storage and data transmission. |
| Monitoring output for a shared resource typically does not tie measurements to a user or account. | Metering a shared resource typically ties measurements to a user or account. |
| Monitoring may have more stringent real-time requirements than metering. | Metering may have real-time requirements also, but typically not as stringent monitoring. |

The most distinguishing feature of metering is the ability to discern between individual client's usages of particular resources. For example, the metering module must be able to determine that client A is using 20 GB of memory and sent 5,000 email messages, while client B simultaneously is using 40 GB of memory and sent 7,000 email messages. Additionally, the metering module must be able to record the substance of every email message sent and the amount of memory and processing power used by the clients. Thus, the metering module's task is considerably more complex than merely observing the consumption of resources.

There are several needs specific to the metering module. The metering must be accurate so that the ODS provider can bill the client the appropriate amount for the service. The metering must be dynamic so that, if desired, the client can pay for the services at the conclusion of the client's use of the ODS resources. The metering must also be thorough in that it must record the specifics of all of the client's transactions so that the billing amount can be verified, if disputed. The metering must also be flexile so that a new metering engine is not required every time the ODS provider adds a new ODS resource to its list of offered ODS resources. Therefore, a need exists for an accurate, dynamic, thorough, and flexible metering engine for use in the ODS environment.

SUMMARY OF THE INVENTION

The present invention is a method for metering on demand service (ODS) resource consumption by a user. Metering an ODS requires that the invention accurately, dynamically, and thoroughly quantify the user's consumption of the ODS resources, but remain flexible enough to be applicable to a variety of different types of ODS resources. The present invention comprises a web services interface, a processing engine, and configuration data. The web services interface obtains usage data from a data gathering agent in the ODS. The data gathering agent stores the usage data in records, combines the records into packets, and transmits the packets to the web services interface as instructed by the packet transmission criteria. The records comprise a fixed number of required fields appended to a variable number of attributes. The web services interface can receive packets from anywhere in the world and passes the packets onto the processing engine.

The processing engine of the present invention receives the packets from the web services interface and stores the records in a database using a Record Processing Program (RPP). The database comprises a record table, an attribute table, and a unit of work (UOW) table. The generalized format of the record is critical to the present invention because it allows the metrics produced by the present invention to be stored in the record table with the usage data. The record table also contains a key to correlate the records in the record table with the attributes in the attribute table. The UOW table specifies the state of each UOW associated with the records. The data in the records is structured so that the original metering records, also called the real records, and the metrics, also called the virtual records, can be stored and retrieved using the same schema.

When a record contains an instruction to close a UOW, the processing engine applies the configuration data to the database using a Rule Application Program (RAP). The configuration data comprises the composition rules and the record selection rules. The composition rules are embodied in the composition rule table and the composition rule attribute table. The record selection rules select the desired records from the database. The record selection rules are embodied in the selection rule table and the selection rule attribute table. The composition rules aggregate, normalize, and algebraically compose the selected records to produce a processed end product called a metric or virtual record that is stored in the record database similarly to real records that have been received from the agent. The metric is used in accounting, auditing, billing, and optimization processes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an illustration of the data gathering agent of the present invention;

FIG. 5 is an illustration of the record of the present invention;

FIG. 12 is an illustration of the composition rule table of the database of the present invention;

FIG. 13 is an illustration of the composition rule attribute table of the database of the present invention;

FIG. 14 is an illustration of the selection rule table of the database of the present invention; and FIG. 15 is an illustration of the selection rule attribute table of the database of the present invention.

DETAILED DESCRIPTION OF THE PREFERRED EMBODIMENT

As used herein, the term "aggregate" shall mean to add the measurement values from a plurality of records together to obtain a single measurement value.

As used herein, the term "to collaborate" shall mean to apply the configuration data to the records from a plurality of ODSs.

As used herein, the term "composition rule" shall mean a policy for processing at least one record into a metric.

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "consume" shall mean to utilize an on demand service resource.

As used herein, the term "key" shall mean an identifier used to associate records with each other, the records being in a plurality of tables in a database.

As used herein, the term "meter" shall mean to count and record a specific user's consumption of on demand service resources.

As used herein, the term "metric" shall mean a processed output which summarizes a particular unit of work.

As used herein, the term "normalize" shall mean to use the last field or attribute from a plurality of records as a representative field or attribute for the plurality of records.

As used herein, the term "on demand service" shall mean a service which is available through a web services interface.

As used herein, the term "packet" shall mean a plurality of records grouped together for transmission.

As used herein, the term "record" shall mean a group of data regarding a specific user's consumption of an on demand service resource.

As used herein, the term "record selection rule" shall mean a policy which selects at least one record from a database.

As used herein, the term "unit of work" shall mean a specific group of records which share common properties, such as occurring in the same day, week, or month, or associated with the same user or resource.

As used herein, the term "usage data" shall mean data regarding a user's consumption of on demand service resources.

Figure 1:
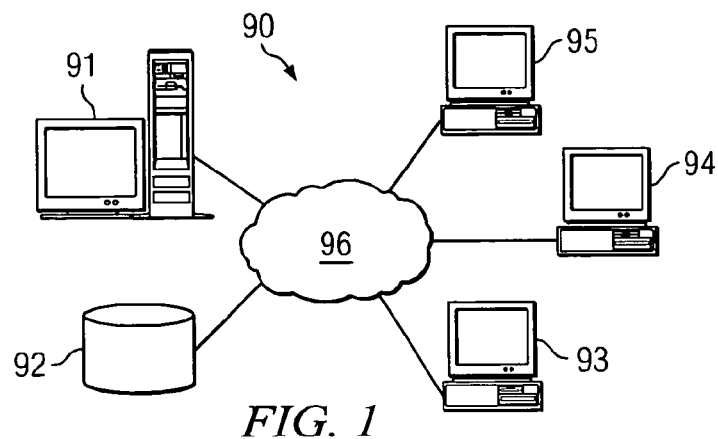
FIG. 1 is an illustration of a computer network used to implement the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network containing the present invention and is not meant as an architectural limitation.

Figure 2:
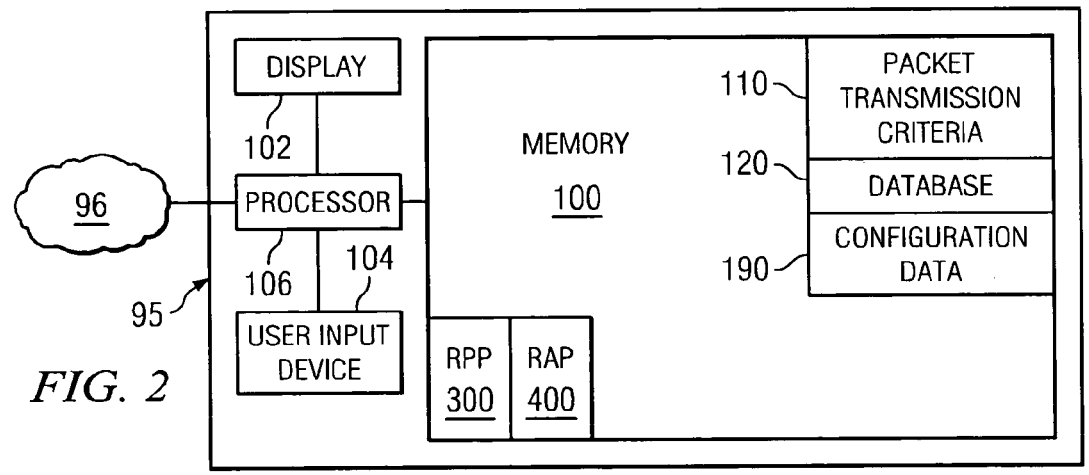
FIG. 2 is an illustration of a computer, including a memory and a processor, associated with the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Record Processing Program (RPP) 300, and Rule Application Program (RAP) 400. RPP 300 and RAP 400 described herein can be stored within the memory of any computer depicted in FIG. 1. Alternatively, RPP 300 and/or RAP 400 can be stored in an external storage device such as a removable disk, a CD-ROM, or a USB storage device. Memory 100 is illustrative of the memory within one of the computers of FIG. 1. Memory 100 also contains packet transmission criteria 110, database 120, and configuration data 190. The present invention may interface with packet transmission criteria 110, database 120, and configuration data 190 through memory 100. As part of the present invention, the memory 100 can be configured with RPP 300 and/or RAP 400. Processor 106 can execute the instructions contained in RPP 300 and/or RAP 400. Processor 106 is also able to display data on display 102 and accept user input on user input device 104. Processor 106, user input device 104, display 102, and memory 100 are part of a computer such as local computer 95 in FIG. 1. Processor 106 can communicate with other computers via network 96.

In alternative embodiments, RPP 300 and/or RAP 400 can be stored in the memory of other computers. Storing RPP 300 and/or RAP 400 in the memory of other computers allows the processor workload to be distributed across a plurality of processors instead of a single processor. Further configurations of RPP 300 and/or RAP 400 across various memories are known by persons of ordinary skill in the art. The present invention may be a method, a stand alone computer program, or a plug-in to an existing computer program. Persons of ordinary skill in the art are aware of how to configure computer programs, such as those described herein, to plug into an existing computer program.

Figure 3:
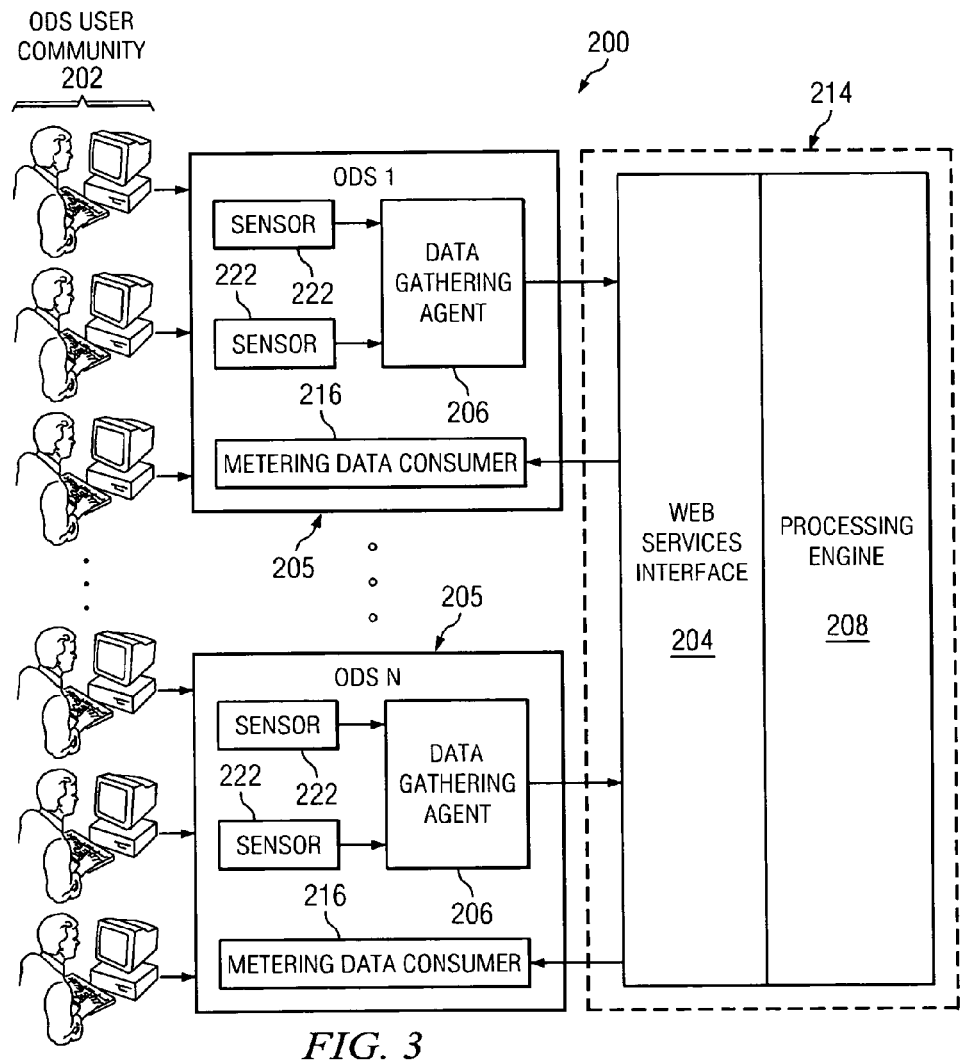
FIG. 3 is an illustration of the flow of data between the user, the ODSs, and the present invention.

FIG. 3 illustrates the interaction of a plurality of users 202 with a plurality of ODSs 205 and metering module 214. Metering module 214 comprises web services interface 204 and processing engine 208. ODS 205 comprises sensors 222, data gathering agent 206, and metering data consumer 216. Sensors 222 observe and record the resource usage by user 202. Agent 206 collects these observations and prepares them as metering records to be sent to web services interface 204. The use of web services interface 204 is important because web services interface 204 allows the present invention to receive usage data from an ODS 205 located anywhere in the world. The use of web services interface 204 also allows the present invention to meter ODS resource usage regardless of the user's language or the computer language used to write the ODS agent. Data gathering agent 206 uses a logmetereddata( ) web services interface call to log the usage data. Alternatively, metering data consumer 216 can query web services interface 204 of the usage data through the use of a getmetereddata( ) call. Metering data consumer 216 may be a part of ODS 205 or may be a part of some other application such as billing, data analysis, accounting, auditing, or reports. Data gathering agent 206 stores the user consumption data in packets and sends packets 224 to processing engine 208 through the web services interface 204. Processing engine 208 permanently stores the usage records for later consumption and uses rules contained in configuration data 210 (see FIG. 6) to compose selected records into virtual records called metrics. Virtual records are created through composition and are stored along with other records in database 210 for later consumption. The consumption may be by metering data consumer 216, or by another application such as data analysis, billing, or reports. It is also possible to configure the metering engine to periodically send data of interest to such applications. The consuming application also may be anywhere in the world and written in any computing language. In alternative embodiments, the metrics can be returned to or passed to accounting modules, auditing modules, optimization modules, or other modules that need the metrics as determined by a person of ordinary skill in the art.

FIG. 4 illustrates the flow of data from ODS 205, through web services interface 204, and into processing engine 208. ODS 205 comprises sensors 222, data gathering agent 206, and metering data consumer 216. Sensors 222 receive usage data from users 202 (not shown) and pass the usage data to data gathering agent 206. Usage data is data regarding the user's consumption of the ODS resources. Data gathering agent 206 receives the usage data from sensors 222 and stores the usage data in a plurality of records 226. Data gathering agent 206 groups the plurality of records 226 together in packet 224. Packet transmission criteria 110 determines when data gathering agent 206 sends packet 224 to web services interface 204. Packet transmission criteria 110 can specify that data gathering agent 206 send packet 224 to web services interface 204 at the occurrence of a pre-determined time interval (i.e. every 5 minutes). Alternatively, packet transmission criteria 110 can specify that data gathering agent 206 sends packet 224 to web services interface 204 when there are a certain number (i.e. fifty) of records 226 in packet 224. Further in the alternative, packet transmission criteria 110 can specify that data gathering agent 206 sends packet 224 to web services interface 204 when any record 226 contains an instruction to close a unit of work (such as close UOW 240 in FIG. 5). Typically, a plurality of packet transmission criteria 110 is specified to ensure that the data in processing engine 208 is current. Persons of ordinary skill in the art will appreciate that a plurality of packet transmission criteria 110 can be combined to produce packet transmission criteria 110 more complex than the examples depicted herein.

FIG. 5 illustrates the structure of record 226. Record 226 comprises two sections: required fields 228 and attributes 230. Required fields 228 are a fixed number of fields in record 226 which are required input from the usage data. Required fields 228 comprise resource ID 232, user ID 234, measurement value 236, unit of work (UOW) 238, close UOW 240, and other fields 242. Resource ID 232 identifies the specific ODS resource that the user is consuming User ID 234 identifies the user's name or account number. Measurement value 236 identifies the amount of the specific resource which is consumed by the user. UOW 238 identifies the group or set to which record 226 belongs. UOW 238 may be a user's total usage, usage for a specific time period (i.e. a month), usage for the current session, or any other group or set identified by a person of ordinary skill in the art. Close UOW 240 is a flag that indicates when the UOW needs to be closed. Any record 226 containing an instruction to close the UOW may also be referred to as a sentinel record because that record 226 closes the UOW and starts the application of the composition rules to the UOW. Closing the UOW is important because the composition rules cannot be applied to records 226 in the UOW until the UOW is closed. Other fields 242 are fields which may be configured for specific applications by the invention administrator. The invention administrator is person of ordinary skill in the art who monitors the operation of the present invention. Examples of other fields 242 are time stamps, date stamps, and auditing fields. Persons of ordinary skill in the art are aware of other types of other fields 242.

In contrast to required fields 228, attributes 230 are a variable number of fields which provide additional information regarding the usage data. Attributes 230 comprise a plurality of pairs of fields, each pair consisting of a name 244 and a value 246. Name 244 describes the type of attribute and value 246 is the specific entry or amount of the attribute. For example, returning to the email account services example, record 226 may be an email sent by one of the ODS client's employees. Required fields 228 records the specific information about the email such as what account the email should be credited to, the amount of memory that the email consumes on the server, and which UOW the email belongs to. Attributes 230 record the sender, the recipient, the subject, the attached files, and the text of the email. The individual names 244 and values 246 for attributes 230 of the example email are listed below in Table 2.

TABLE 2

| Name | Value |
|------|-------|
| Sender | Joe@white.com |
| Recipient | Barry@black.com |
| Recipient | Charlie@green.com |
| Subject | Test |
| Attachments | C:\testdoc.doc |
| Text | This is a test message. -Al |

As can be seen in Table 2, the number and length of attributes 230 will vary from one email to another based on the number of recipients, whether there is a subject, whether there are attached files and the length of the email text. Required fields 228 and attributes 230 allow the present invention to meter the user's consumption of ODS resources and record precise details regarding the user's consumption of ODS resources in a generalized format that is adaptable to a wide variety of different ODS.

The generalized format of record 226 is a critical aspect of the present invention. If all the records have the same format, the real records can be stored and processed along with the virtual records and the present invention does not have to be modified to accommodate new ODS that introduce new record formats. The rules language for selecting records to participate in the composition can also be generic. In other words, the administrator of the present invention does not have to modify the selection language based on the record format. The generalized format is also important for the composition language because the metric (also known as a virtual record) created by the composition rules then have the same format as all the real records and can be stored and processed along with the real records. The same format for record 226 and the metric means that the metric can simply be inserted into database 120 along with the unprocessed records 226. The generalized format also facilitates the definition of the composition language, because the fields that must be formed for the metric can be selected or composed from the associated fields of one or more of the raw records 226 selected for the composition. The attributes 230 permits record 226 to record other usage data while still conforming to a generalized format.

Figures 6, 8, 9, 10:
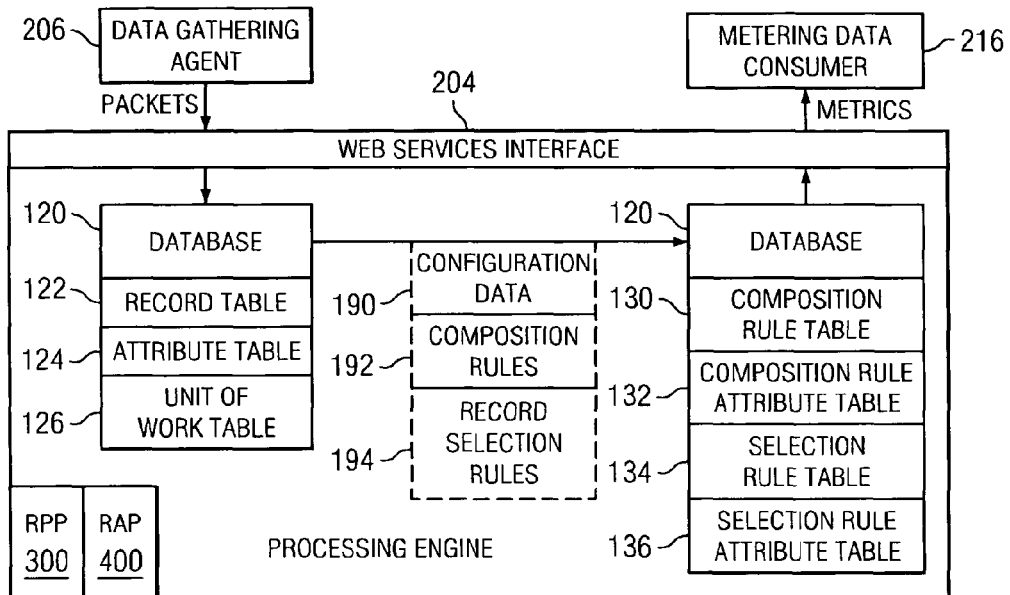
FIG. 6 is an illustration of the processing engine of the present invention.
FIG. 8 is an illustration of the record table of the database of the present invention.
FIG. 9 is an illustration of the record attribute table of the database of the present invention.
FIG. 10 is an illustration of the Unit of Work (UOW) table of the database of the present invention.

FIG. 6 illustrates the flow of data from data gathering agent 206, through web services interface 204, through processing engine 208, and onto metering data consumer 216. Web services interface 204 receives packets from data gathering agent 206 and passes the packets onto processing engine 208. When processing engine 208 receives packets from web services interface 204, processing engine 208 uses Record Processing Program (RPP) 300 to store records 226 in packet 224 in database 120. Database 120 comprises record table 122, attribute table 124, and UOW table 126. Required fields 228 in record 226 are stored in record table 122. Attributes 230 in record 226 are stored in attribute table 124. UOW table 126 lists the current state of every open UOW. If necessary, the RPP 300 and/or Rule Application Program (RAP) 400 update UOW table 126 using the data in record 226.

When record 226 contains an instruction to close a UOW, processing engine 208 uses Rule Application Program (RAP) 400 to apply configuration data 190 to database 120. Configuration data 190 comprises composition rules 192 and record selection rules 194. Upon application of configuration data 190 to database 120, processing engine 208 creates metrics from composition rule table 130, composition rule attribute table 132, selection rule table 134, and selection rule attribute table 136. The metrics are then stored in database 120 where they are available to various metering data consumers 216 through the getMeteredData web services interface. Metering data consumers 216 may be billing, accounting, optimization, data mining, or any other module as determined by a person of ordinary skill in the art.

Figure 7:
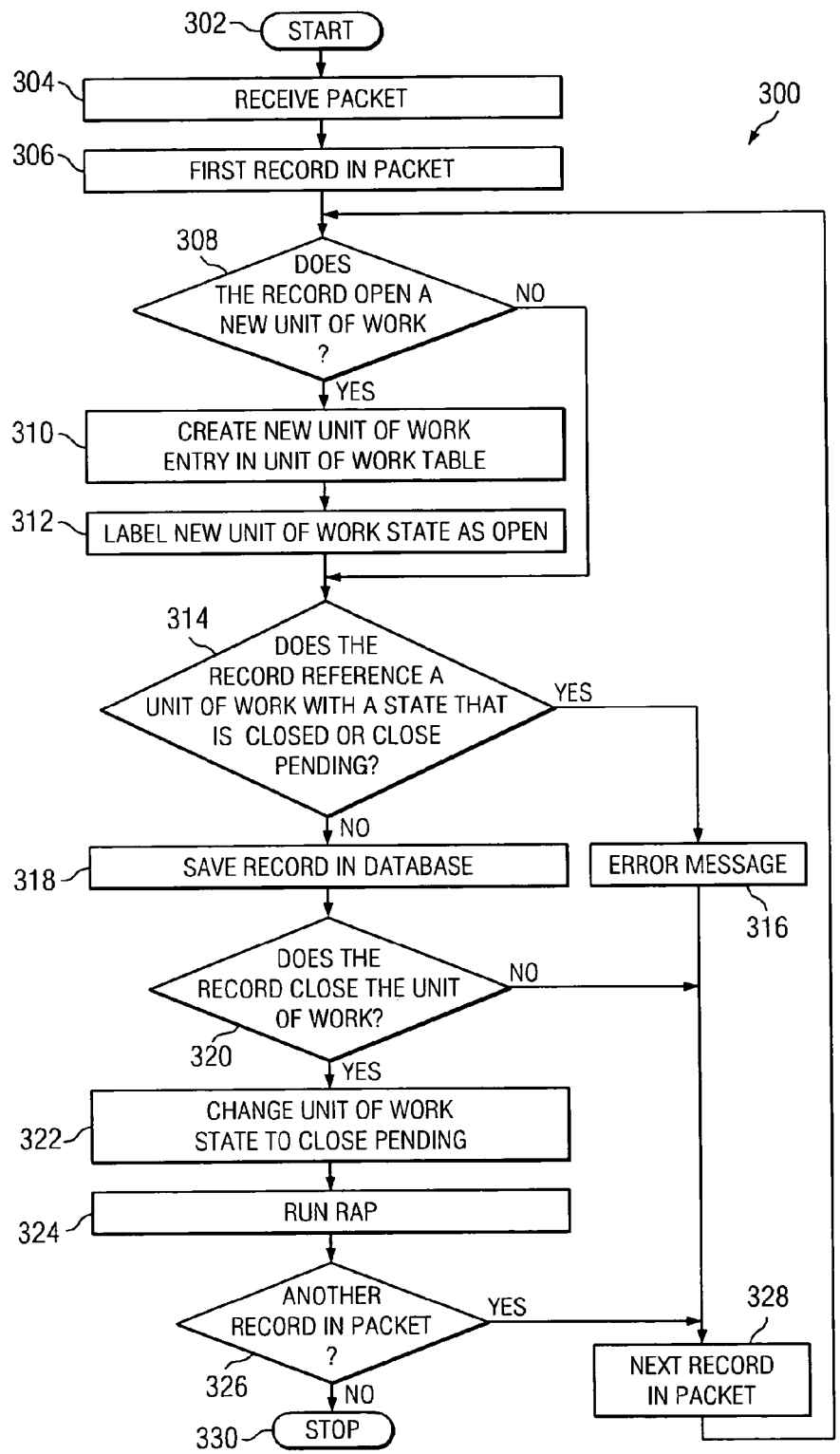
FIG. 7 is an illustration of the logic of the Record Processing Program (RPP) of the present invention.

FIG. 7 illustrates the logic of Record Processing Program (RPP) 300 of the present invention. RPP 300 is a program that processes records 226 in packets 224 that are received by processing engine 208 in FIG. 6. RPP 300 starts (302) whenever packet 224 is received by processing engine 208 (304). RPP 300 goes to the first record in packet 224 (306) and determines whether record 226 opens a new UOW (308). Record 226 opens a new UOW if record 226 references a UOW that is not already listed in UOW table 126. If record 226 does not open a new UOW, RPP 300 proceeds directly to step 314. If record 226 opens a new UOW, then RPP 300 creates a new UOW entry in UOW table 126 (310). In creating a new UOW, RPP 300 creates an entry for the UOW specified by record 226. RPP 300 also labels the state of the new UOW entry in UOW table 126 as open (312) then proceeds to step 314.

At step 314, RPP 300 determines whether record 226 references a UOW with a state that is closed or close pending (314). If record 226 references a UOW with a state of closed or close pending, then RPP 300 sends an error message to the administrator of the present invention (316) and proceeds to step 328. The administrator of the present invention is a person of ordinary skill in the art who manages the daily operation of the present invention for the ODS provider. If at step 314 record 226 does not reference a UOW with a state of close or close pending, RPP 300 saves record 226 in database 120 (318), and proceeds to step 320.

At step 320, RPP 300 then determines whether record 226 contains an instruction to close the UOW (320). If record 226 does not contain an instruction to close the UOW, then RPP 300 proceeds to step 328. If record 226 contains an instruction to close the UOW, then RPP 300 changes the UOW state in UOW table 126 to close pending (322) and runs RAP 400 (324). RPP 300 then determines whether there is another record 226 in packet 224 (326). If there is another record 226 in packet 224, then RPP 300 goes to the next record 226 in packet 224 (328) and returns to step 308. If at step 326 there is not another record 226 in packet 224, RPP 300 ends (330).

FIG. 8 illustrates record table 122 of the present invention. Record table 122 is a list of required fields 228 from record 226 in packet 224. Record table 122 comprises MID 140, RID 142, UID 144, MV 146, UOW 148, and rule ID 150. When a new record 226 is added to record table 122, processing engine 208 creates a new MID 140. MID 140 is a sequential number created by processing engine 208 that is a key for record table 122 and attribute table 124 (discussed below). After processing engine 208 creates a new MID 140, processing engine 208 copies resource ID 232 from record 226 to RID 142. Processing engine 208 also copies user ID 234 in record 226 to UID 144. Processing engine 208 also copies measurement value 236 in record 226 to MV 146. Processing engine 208 also copies UOW 238 in record 226 to UOW 148. In addition to identifying the particular UOW record 226 is associated with, UOW 148 is also used as key between record table 122 and UOW table 126. Rule ID 150 is only used when the entry is a metric that has been generated through application of configuration data 190 to database 120. A metric may also be referred to as a virtual record because the metric is a calculated amount, not a metered record. Rule ID 150 is a key into composition rule table 130 and references the rule that was used to generate the metric. Therefore, the resulting metrics will be stored in record table 122 and attribute table 124 and have the same appearance of any other record 226 with the exception that rule ID 150 will specify which composition rule 192 created the metric. An example of an entry in rule ID 150 for a metric would be the number 906, which would reference rule 906 in FIGS. 12 through 15. In the example illustrated in FIG. 8, records 226 are measurements of CPU usage (RID=100) and memory usage (RID=101) by emails associated with users Joe (UID=Joe) and Al (UID=Al). UOW 148 indicates the set or group to which record 226 belongs. UOW 148 defines groups of records 226. Composition rules 192 will later be applied. UOW 148 may be correlated with whatever ODS 205 wants to define as a set. For example, UOW 148 may be all of records 226 sent by a specific department within a 1 hour period. UOW 148 may also indicate the set of records 226 occurring during the user's login session, all records 226 for all users in a twenty-four hour period, or all records 226 associated with a particular transaction.

FIG. 9 illustrates attribute table 124 of the present invention. Attribute table 124 is a list of the attributes 230 from record 226 in packet 224. Attribute table 124 comprises MID 140, name 152, and value 154. MID 140 is a key that links record table 122 and attribute table 124. Because a single record 226 may have a plurality of attributes 230, there may be a plurality of entries with the same MID 140 in attributes table 124. In FIG. 9, the sender and recipients from the example attributes in Table 2 are illustrated as MID=534. Although not illustrated, attributes table 124 contains all of the other attributes from table 2 under the MID=534. Attributes table 124 contains entries for all attributes 230, as evidenced by the entry for the attribute for email with MID=539 where Joe@white.com sent an email only to Charlie@green.com.

FIG. 10 illustrates UOW table 126. UOW table 126 is a table which lists the current state of every UOW. UOW table 126 comprises UOW 148 and state 156. UOW 148 is a key that links record table 122 and UOW table 126. State 156 is the current state of the UOW and may be open, close pending, or closed. An open UOW is one that is still accepting new records. A close pending UOW is one that has received an instruction to close the UOW, but in which configuration data 190 has not yet been applied to database 120. A closed UOW is one in which configuration data 190 has been applied to database 120 to produce the metrics.

Figure 11:
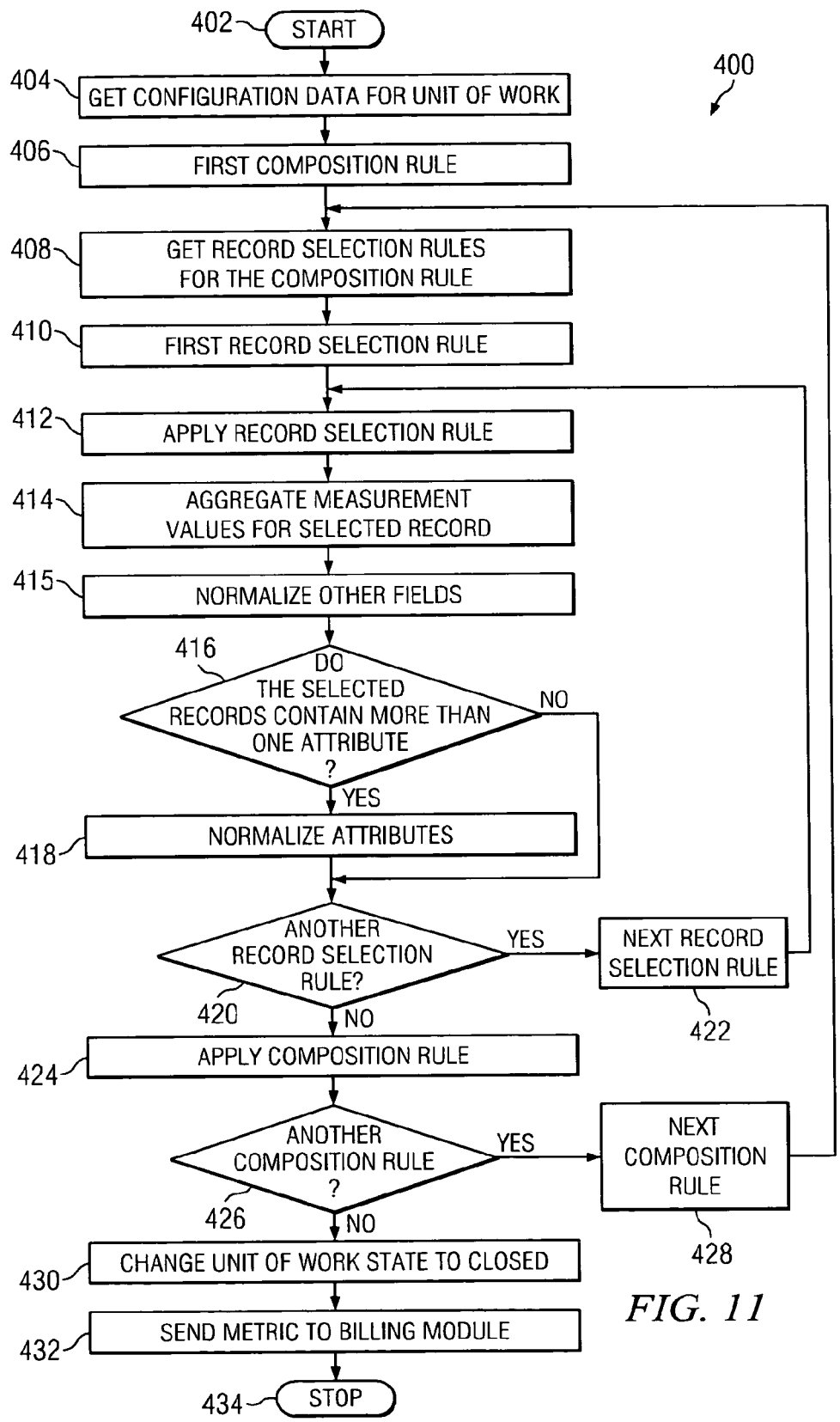
FIG. 11 is an illustration of the logic of the Rule Application Program (RAP) of the present invention.

FIG. 11 illustrates the logic of Rule Application Program (RAP) 400 of the present invention. RAP 400 is a program that applies the rules in configuration data 190 to database 120 to create the metrics. RAP 400 may optionally collaborate the records. Collaboration in the process of applying the configuration data to records from a plurality of ODSs. RAP 400 starts (402) when invoked by RPP 300. RAP 400 then obtains configuration data 190 for the present UOW (404). The present UOW is the UOW referenced by record 226 which contained the close UOW flag. RAP 400 then goes to the first composition rule 192 in configuration data 190 (406) and obtains record selection rules 194 for the present composition rule 192 (408). Each composition rule 192 is associated with at least one record selection rule 194. By analyzing composition rule 192, processing engine 208 can determine which record selection rules 194 are associated with the present composition rule 192.

RAP 400 then goes to the first record selection rule 194 associated with the present composition rule 192 (410) and applies record selection rule 194 to database 120 (412). Record selection rule 194 does not have to specify a particular UOW because record selection rule 194 is applied to a particular UOW when the UOW is closed by record 226. Record selection rule 194 is in the general form:

"Tag Name"=("Field1"="Value" and "Field2"="Value2" and ...)

As previously stated, the above record selection rule 194 is in the general form. The administrator replaces the items in quotation marks with specific tag names, field names, and value names. The administrator may also select records based upon the records' attributes. Continuing the email account services example, if a particular record selection rule, A, wanted to select the memory usage (the RID for memory usage is 101) associated with a user Al, and a receiver Joe, then record selection rule 194 would look like:

A=(RID=101 and UID=Al and RECEIVER=JOE)

In addition to specific tag names, field names, or value names, record selection rule 194 can contain two other types of entry for the values: "any" and "unique." An entry of "any" in the value field of record selection rule 194 indicates that record selection rule 194 will select all of records 226 with a non-null entry in that field. Substituting "any" in place of "Al" in the above example will make processing engine 208 select records 226 sent to Joe that have any UID entry. The any entry is useful when processing engine 208 is concerned with a set of records qualified by a subset of field values.

An entry of "unique" instructs processing engine 208 to repeat record 226 selection process for every different type of entry in the identified field. Substituting "unique" in place of "Al" in the above example instructs processing engine 208 to repeat record 226 selection process for every different entry in the UID field. The unique entry in this case selects a list of memory resource consumption records for specific (unique) user. That is, processing engine 208 selects multiple sets, a set of records for each unique user. Unique is useful when processing engine 208 is specifying a calculation to be performed for each unique set. For example to calculate the memory consumed by each user, but is unable to predict which users may appear in the unit of work set. Unique is also easier to specify than listing each potential user that may appear in the set.

After records 226 have been selected, RAP 400 aggregates measurement values 236 for the selected records (414). RAP 400 then normalizes the other fields in the selected records 226 (415). Then RAP 400 determines whether the selected records contain more than one attribute (416). If the selected records contain, in total, one attribute, then RAP 400 proceeds to step 420. If, however, the selected records contain more than one attribute, RAP 400 normalizes the attributes (418). In normalizing the attributes, RAP 400 selects the last attribute for the last record in the selected records. In an example of normalization, if the records selection rule selects three records based on specifying SENDER=Joe and RID=101, the present invention can form a resultant value for the memory usage of the records by adding the memory usage for each of the records. However, the records may contain a plurality of recipients, such as Adam, Mary, and Al. Because one resultant attribute is needed, the present invention normalizes the receiver field by keeping the last value, in this case Al. If the administrator of the present invention is particularly interested in data regarding the receiver, the administrator can specify the receiver in addition to the sender in the record selection rule 194. RAP 400 then proceeds to step 420 and determines whether there is another record selection rule (420). If there is another record selection rule, then RAP 400 proceeds to the next record selection rule (422) and returns to step 412. If there are not any record selection rules remaining, then RAP 400 goes to step 424.

At step 424, RAP 400 applies composition rule 192 (424). Composition rule 192 performs a calculation on the measurement values within records 226 selected by record selection rules 194. Composition rule 192 also specifies the values of the other fields (i.e. not the measurement value) within record 226. The measurement value calculation is configured by the administrator of processing engine 208, but may be a single number, such as the total memory usage, or may be more complex, such as the two times the total memory usage plus the total CPU usage. Persons of ordinary skill in the art are aware of different types of calculations that will generate useful metrics. Composition rule 192 defines the other fields and attributes as the field or attribute in a specific tag name. Alternatively, composition rule 192 can define the other field or attribute as a value defined in composition rule table 130 or composition rule attribute table 132. RAP 400 stores the composed metric or metrics (virtual record) in database 120 similar to records 226. RAP 400 indicates in record table 122 which composition rule 192 was used to computer the metric. Note that in the case where "unique" was used to select records 226, the composition is performed on each set, which produces multiple metrics from the application of a single composition rule 192.

RAP 400 then determines if there is another composition rule (426). If there is another composition rule, RAP 400 goes to the next composition rule (428) and returns to step 408. If at step 430 there are not any composition rules remaining, RAP 400 changes the state for the present UOW to closed (430). The computed metrics are then available for consumption through the consumer interface. RAP 400 can be configured to send the processed data for the present UOW to one or more metering data consumers at this time (432). The metering data consumers may include a billing module, an accounting module, an optimization module, an auditing module, or any other module as specified by a person of ordinary skill in the art.

FIG. 12 illustrates composition rule table 130 of the present invention. Composition rule table 130 lists the calculation formula for each composition rule and the user associated with the calculation. Composition rule table 130 comprises virtual resource ID (VRID) 158, value 160, reference tag 162 and UID 164. VRID 158 is a sequential number identifying a result obtained from configuration data 190. VRID 158 is also used as a key to composition rule attribute table 132. Processing engine 208 creates a new VRID 158 for every entry created by configuration data 190. Value 160 is the formula used to calculate the result obtained from configuration data 190. The letters in value 160 fields refer to tag names 172 in selection rule table 134. Reference tag 162 indicates whether the user associated with the particular entry is referenced within one of the tag names 172. If reference tag 162 is yes, then UID 164 indicates which tag name 172 the user ID is located in. If reference tag 162 is no, then UID 164 indicates the user ID associated with the present composition rule.

FIG. 13 illustrates composition rule attribute table 132 of the present invention. Composition rule attribute table 132 lists the attributes associated with each composition rule. Composition rule attribute table 132 comprises VRID 158, reference tag 166, name 168, and value 170. VRID 158 is the same as VRID 158 in FIG. 12. Similar to reference tag 162 in FIG. 12, reference tag 166 indicates whether the user associated with the particular entry is referenced within one of the valued 170. If reference tag 166 is yes, then value 170 indicates which tag name 172 the user ID is located in. If reference tag 166 is no, then value 172 indicates the user ID associated with the present composition rule. Name 168 is the name associated with value 170.

FIG. 14 illustrates selection rule table 134 of the present invention. Selection rule table 134 lists the tag names and the search criteria for the composition rules. Selection rule table 134 depicted in FIG. 14 comprises VRID 158, tag name 172, RID 174, and UID 176. VRID 158 is the same as VRID 158 in FIGS. 12 and 13. Tag name 172 is the tag name used in value 160. For example, the A and B referenced in the row in which VRID=906 in FIG. 12 refer to the rows in which (VRID=906 and tag name=A) and (VRID=906 and tag name=B) in FIG. 14. RID 174 is the same as Resource ID 232 in FIG. 5 and UID 176 is the same as User ID 234 in FIG. 5.

Although every selection rule table 134 will contain VRID 158 and tag name 172, the remaining columns will vary depending on the ODS administrator's configuration of the present invention. The remaining columns will vary because the remaining columns are the fields from record selection rule 194 in step 412 of FIG. 11. For example, the following record selection rule is captured in the second entry into the table in FIG. 14:

B=(RID=101 and UID=unique)

The above record selection rules of list of memory usage (RID=101) for each unique user.

FIG. 15 illustrates selection rule attribute table 136 of the present invention. Selection rule attribute table 136 lists the attributes associated with the rules in selection rule table 134. Selection rule attribute table 136 comprises VRID 158, tag name 172, name 178, and value 180. VRID 158 is the same as VRID 158 in FIG. 14. Tag name 172 is the same as tag name 172 in FIG. 14. In addition to the required fields 228 in FIG. 5, record selection rule 194 can select records based on the attributes of records 226. As an example, the first entry in the table in FIG. 15 selects emails with any sender. However, in the second entry in FIG. 15 selects records wherein the receiver is Charlie@green.com. Persons of ordinary skill in the art are aware of other methods for configuring the attributes portion of record selection rule 194 of the present invention to create a group of records which have been selected based on their attributes.

The present invention can be configured with user friendly graphical user interfaces (GUIs) to assist a user in creating the rules for the composition process described herein. One example of a user friendly GUI is a wizard. A wizard helps the user create the composition described herein by taking the user through a series of small steps to create the composition rules. The user friendly GUIs and/or the wizard may utilize a spreadsheet format to assist the user in creation of the composition rules herein.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for metering use of at least one of a plurality of resources in an on-demand service environment, the method comprising the steps of:
    a computer receiving a usage record that indicates a particular state and includes an identifier that identifies a group of records, wherein the group of records includes the usage record;
    the computer including in each one of the group of records an identification of one of the plurality of resources, an identification of one of a plurality of users that used the one of the plurality of resources, and an amount of usage of the one of the plurality of resources by the one of the plurality of users;
    the computer storing the usage record in a record table, wherein the record table includes values of different types of usages of different ones of the plurality of resources, and wherein the group of records is stored in the record table;
    the computer using a first rule to select a plurality of the group of records, wherein the first rule identifies at least one of the plurality of users and at least one of the plurality of resources that was used by the identified at least one of the plurality of users
    the computer adding each amount of usage included in each one of the plurality of the group of records to determine a total usage; and
    the computer using the total usage and a formula that is included in a second rule to calculate a metric, wherein the second rule includes an identification of the at least one of the plurality of users that used the at least one of the plurality of resources.

2. The method of claim 1 further comprising:
    the computer storing the metric as a first entry in a format in the record table and storing the usage record as a second entry in the format in the record table, wherein the second entry is a virtual record.

3. The method of claim 1 wherein
    the particular state is either closed or close pending, and wherein additional new records can be added to the group of records when the state is open, wherein the metric has been calculated when the particular state is closed, and wherein an instruction has been received to close the group of records when the particular state is close pending.

4. The method of claim 1 further comprising the steps of:
    in response to the computer receiving the usage record that indicates the particular state, the computer changing, in a state table, a status of the group of records to close pending; and
    wherein the usage record indicates the particular state using a flag that is stored in a required field of the usage record.

5. The method of claim 1 further comprising:
    responsive to the computer calculating the metric, the computer changing a state of the group of records to closed.

6. The method of claim 1, wherein the different types of usages include an amount of a usage of a memory, an amount of a usage of a processor, and a quantity of forms that were accessed.

7. The method of claim 1, wherein the particular state is closing a unit of work, and wherein the unit of work is a specified time period.

8. The method of claim 1, wherein the formula uses a first value of a usage of a first one of the plurality of resources by a first one of the plurality of users and a second value of a usage of a second one of the plurality of resources by a second one of the plurality of users.

9. The method of claim 1 further comprising:
    the computer using a rule field in a format to identify the second entry as the virtual record by storing an identification of the second rule in the rule field.

10. A program product for metering use of at least one of a plurality of resources in an on-demand service environment, the program product comprising:
    one or more computer-readable storage devices;
    program instructions, stored on at least one of the one or more storage devices, to receive a usage record that indicates a particular state and includes an identifier that identifies a group of records, wherein the group of records includes the usage record;
    program instructions, stored on at least one of the one or more storage devices, to include in each one of the group of records an identification of one of the plurality of resources, an identification of one of a plurality of users that used the one of the plurality of resources, and an amount of usage of the one of the plurality of resources by the one of the plurality of users;
    program instructions, stored on at least one of the one or more storage devices, to store the usage record in a record table, wherein the record table includes values of different types of usages of different ones of the plurality of resources, and wherein the group of records is stored in the record table;
    program instructions, stored on at least one of the one or more storage devices, to use a first rule to select a plurality of the group of records, wherein the first rule identifies at least one of the plurality of users and at least one of the plurality of resources that was used by the identified at least one of the plurality of users
    program instructions, stored on at least one of the one or more storage devices, to add each amount of usage included in each one of the plurality of the group of records to determine a total usage; and
    program instructions, stored on at least one of the one or more storage devices, to use the total usage and a formula that is included in a second rule to calculate a metric, wherein the second rule includes an identification of the at least one of the plurality of users that used the at least one of the plurality of resources.

11. The program product of claim 10 further comprising:
    program instructions, stored on at least one of the one or more storage devices, to store the metric as a first entry in a format in the record table and store the usage record as a second entry in the format in the record table, wherein the second entry is a virtual record.

12. The program product of claim 10, wherein
the particular state is either closed or close pending, the program product further comprising:
program instructions, stored on at least one of the one or more storage devices, responsive to the state being open, to permit additional new records to be added to the group of records.
program instructions, stored on at least one of the one or more storage devices, responsive to the state being closed, to calculate the metric; and
program instructions, stored on at least one of the one or more storage devices, responsive to receiving an instruction to close the group of records, to change the particular state to close pending.

13. The program product of claim 10 further comprising:
program instructions, stored on at least one of the one or more storage devices, responsive to receiving the usage record that indicates the particular state, to change, in a state table, a status of the group of records to close pending; and
wherein the usage record indicates the particular state using a flag that is stored in a required field of the usage record.

14. The program product of claim 10 further comprising:
program instructions, stored on at least one of the one or more storage devices, responsive to calculating the metric, to change a state of the group of records to closed.

15. The program product of claim 10, wherein the different types of usages include an amount of a usage of a memory, an amount of a usage of a processor, and a quantity of forms that were accessed.

16. The program product of claim 10, wherein the particular state is closing a unit of work, and wherein the unit of work is a specified time period.

17. The program product of claim 10 wherein the formula uses a first value of a usage of a first one of the plurality of resources by a first one of the plurality of users and a second value of a usage of a second one of the plurality of resources by a second one of the plurality of users.

18. The program product of claim 10 further comprising:
program instructions, stored on at least one of the one or more storage devices, to use a rule field in a format to identify the second entry as the virtual record by storing an identification of the second rule in the rule field.

19. A computer system for metering use of at least one of a plurality of resources in an on-demand service environment, the computer system comprising:
one or more processors, one or more computer-readable memories and one or more computer-readable storage devices;
program instructions, stored on at least one of the one or more storage devices for execution by at least one of the one or more processors via at least one of the one or more memories, to receive a usage record that indicates a particular state and includes an identifier that identifies a group of records, wherein the group of records includes the usage record;
program instructions, stored on at least one of the one or more storage devices for execution by at least one of the one or more processors via at least one of the one or more memories, to include in each one of the group of records an identification of one of the plurality of resources, an identification of one of a plurality of users that used the one of the plurality of resources, and an amount of usage of the one of the plurality of resources by the one of the plurality of users;
program instructions, stored on at least one of the one or more storage devices for execution by at least one of the one or more processors via at least one of the one or more memories, to store the usage record in a record table, wherein the record table includes values of different types of usages of different ones of the plurality of resources, and wherein the group of records is stored in the record table;
program instructions, stored on at least one of the one or more storage devices for execution by at least one of the one or more processors via at least one of the one or more memories, to use a first rule to select a plurality of the group of records, wherein the first rule identifies at least one of the plurality of users and at least one of the plurality of resources that was used by the identified at least one of the plurality of users;
program instructions, stored on at least one of the one or more storage devices for execution by at least one of the one or more processors via at least one of the one or more memories, to add each amount of usage included in each one of the plurality of the group of records to determine a total usage; and
program instructions, stored on at least one of the one or more storage devices for execution by at least one of the one or more processors via at least one of the one or more memories, to use the total usage and a formula that is included in a second rule to calculate a metric, wherein the second rule includes an identification of the at least one of the plurality of users that used the at least one of the plurality of resources.

20. The computer system of claim 19 further comprising:
program instructions, stored on at least one of the one or more storage devices for execution by at least one of the one or more processors via at least one of the one or more memories, to store the metric as a first entry in a format in the record table and store the usage record as a second entry in the format in the record table, wherein the second entry is a virtual record.

21. The computer system of claim 19, wherein the particular state is either closed or close pending, the computer system further comprising:
program instructions, stored on at least one of the one or more storage devices for execution by at least one of the one or more processors via at least one of the one or more memories, responsive to the state being open, to permit additional new records to be added to the group of records;
program instructions, stored on at least one of the one or more storage devices for execution by at least one of the one or more processors via at least one of the one or more memories, responsive to the state being closed, to calculate the metric; and
program instructions, stored on at least one of the one or more storage devices for execution by at least one of the one or more processors via at least one of the one or more memories, responsive to receiving an instruction to close the group of records, to change the particular state to close pending.

22. The computer system of claim 19 further comprising the steps of:
program instructions, stored on at least one of the one or more storage devices for execution by at least one of the one or more processors via at least one of the one or more memories, responsive to receiving that usage record that indicates the particular state, to change, in a state table, a status of the group of records to close pending; and wherein the usage record indicates the particular state using a flag that is stored in a required field of the usage record.

23. The computer system of claim 19 further comprising: program instructions, stored on at least one of the one or more storage devices for execution by at least one of the one or more processors via at least one of the one or more memories, responsive to the program instructions calculating the metric, to change a state of the group of records to closed.

24. The computer system according to claim 19, wherein the different types of usages include an amount of a usage of a memory, an amount of a usage of a processor, and a quantity of forms that were accessed.

25. The computer system according to claim 19, wherein the particular state is closing a unit of work, and wherein the unit of work is a specified time period.

26. The computer system according to claim 19 wherein the formula uses a first value of usage of a first one of the plurality of resources by a first one of the plurality of users, and a second value of usage of a second one of the plurality of resources by a second one of the plurality of users.

27. The computer system according to claim 19 further comprising:
- program instructions, stored on at least one of the one or more storage devices for execution by at least one of the one or more processors via at least one of the one or more memories, to use a rule field in a format to identify the second entry as the virtual record by storing an identification of the second rule in the rule field.

* * * * *